(12) United States Patent
Meraldi

(10) Patent No.: US 7,032,637 B2
(45) Date of Patent: Apr. 25, 2006

(54) TIRE REINFORCED BY AN ELONGATE COMPOSITE ELEMENT OF THE MONOFILAMENT TYPE, AND SUCH ELEMENT

(75) Inventor: Jean-Paul Meraldi, Zurich (CH)

(73) Assignee: Conception et Developpement Michelin S.A., Givisiez (CH)

( * ) Notice: Subject to any disclaimer, the term of this patent is extended or adjusted under 35 U.S.C. 154(b) by 516 days.

(21) Appl. No.: 09/883,039

(22) Filed: Jun. 15, 2001

(65) Prior Publication Data

US 2002/0043319 A1    Apr. 18, 2002

(30) Foreign Application Priority Data

Jun. 22, 2000    (FR) .................................. 00 08115

(51) Int. Cl.
*B60C 9/00*    (2006.01)
*B60C 9/18*    (2006.01)
*D02G 3/48*    (2006.01)

(52) U.S. Cl. ...................... 152/451; 152/527; 152/556; 428/297.4; 428/299.4; 428/364; 428/392

(58) Field of Classification Search ................ 152/451, 152/527, 556; 57/902; 428/297.4, 298.1, 428/299.4, 364, 392, 394
See application file for complete search history.

(56) References Cited

U.S. PATENT DOCUMENTS

| | | | |
|---|---|---|---|
| 3,516,465 A | 6/1970 | Guyot | 152/361 |
| 3,608,606 A | 9/1971 | Marzocchi | 152/361 |
| 3,682,217 A | 8/1972 | Marzocchi | 152/356 |
| 3,730,678 A | 5/1973 | Wedler et al. | 8/149.1 |
| 3,918,506 A | 11/1975 | Marzocchi | 152/361 |
| 4,216,856 A * | 8/1980 | Moring | 198/847 |
| 4,506,717 A | 3/1985 | Thise-Fourgon | 152/358 |
| 5,151,142 A * | 9/1992 | Imai | 152/565 |
| 5,246,051 A * | 9/1993 | Inada | 152/527 |
| 5,291,930 A | 3/1994 | Kikuchi et al. | 152/451 |
| 5,427,165 A | 6/1995 | Balestra et al. | 152/450 |
| 6,068,916 A * | 5/2000 | Takeuchi | 428/377 |

FOREIGN PATENT DOCUMENTS

| | | |
|---|---|---|
| EP | 0475745 | 3/1992 |
| JP | 57181826 | * 11/1982 |
| JP | 63134310 | * 6/1988 |
| JP | 04185511 | * 7/1992 |
| JP | 04202825 | * 7/1992 |
| JP | 05124119 | * 5/1993 |
| JP | 05269889 | * 10/1993 |
| WO | 9212018 | 7/1992 |

OTHER PUBLICATIONS

Platt et al. "Mechanics of Elastic Performance of Textile Materials" Textile Research Journal, Aug. 1959, 29:611-627.

(Continued)

*Primary Examiner*—Jeff H. Aftergut
*Assistant Examiner*—Justin Fischer
(74) *Attorney, Agent, or Firm*—Cohen, Pontani, Lieberman & Pavane

(57) ABSTRACT

A tire, in particular an elastomeric pneumatic tire, reinforced by lengths of a monofilament elongate composite element of long glass fibers impregnated in a thermoset resin having a glass transition temperature $T_g$ greater than 130° C., in which the fibers are all parallel to each other, the elongate composite element having, under a bending stress an elastic deformation in compression of at least 2%, in flexion a breaking stress in compression greater than the breaking stress in extension.

24 Claims, 1 Drawing Sheet

OTHER PUBLICATIONS

M. G. Dobbs et al., Compressional behavior of Kevlar fibers, Polymer, 1981, vol. 22, Jul., p. 960-965.

Platt et al. "The continuous flow cleaning line," Textile Research Journal, 1959, 29:727-732.

* cited by examiner

TIRE REINFORCED BY AN ELONGATE COMPOSITE ELEMENT OF THE MONOFILAMENT TYPE, AND SUCH ELEMENT

BACKGROUND OF INVENTION

The invention relates to a pneumatic tire, and more particularly to a non-pneumatic tire made of reinforced elastomer. The invention is directed to a novel reinforcement element, for example, as a substitute for steel cords or aramid cables which are used for reinforcing tires.

An element of choice, which is widely used for reinforcing pneumatic tires, is the steel cord. It is known that the technique of cabling enables the reinforcement element to achieve relatively low radii of curvature while enabling it to withstand high stresses. A large number of elementary wires of small section are assembled such that, despite a cumulated section which is sufficiently large to achieve the desired resistance potential, each individual section remains sufficiently small to permit small radii of curvature without achieving permanent plastic deformation.

Using an assembly of elements of small section also makes it possible, in the case of steel, to limit the flexural rigidity. The flexural rigidity is the product of the Young's modulus and the moment of inertia of the section.

Many other materials are used, in particular textile materials. Mention may be made of rayon, nylon or, to mention a more modem material, aramid. However, the majority of uses do not make it possible to avoid having to assembly a plurality of filaments of small section in order to be able to achieve required performances in terms of transmission of forces and ability to be deformed. Unfortunately, the fact of needing to use an assembly, most frequently by plying in the case of a textile, restricts the properties of modulus in extension and does not impart, or imparts only little, flexural rigidity to the assembly. On the other hand, the microscopic size of the elementary filaments which form the textile spun yarns makes it possible for them to have relatively small radii of curvature. Although, in the belt of a radial tire, the textile plied yarns yield a saving in weight which is beneficial to certain aspects of the rolling resistance and eliminate the problems of corrosion, their lack of flexural rigidity, and in some cases of modulus in extension, does not make it possible to guarantee the excellent guiding stability and the wear resistance of the steel belt.

Instead of steel reinforcement elements, it has already been proposed, for example in patent application EP 0 475 745, to use a textile elongate composite element having essentially the following characteristics: the elongate element must be elliptical or rectangular; it comprises fibers selected from among aramid, glass, PVA and carbon; the initial modulus of extension of the impregnation resin used must not exceed 1.5 GPa. The selection criterion for these fibers which is proposed is a high tenacity (specific breaking load), greater than 15 g/denier (or 136 g/tex). However, aramid, PVA and partially carbon, unlike glass, have an acknowledged intrinsic weakness in terms of compressive strength. This disadvantage becomes apparent in particular in the application of these fibers to reinforcing tires, and results from their acknowledged weakness in terms of compressive strength. Doubtless in order to attempt to overcome this disadvantage, it is proposed to associate these fibers with a resin of low rigidity, which, for a given curvature imposed on the elongate composite element, stresses said element less. However, this choice causes some problems because it is not possible sufficiently to guarantee, over the entire life of the tire, sufficient compressive strength for belt reinforcement elements, which are under great bending stress, particularly at the edges of the triangulation plies in the belt.

To increase the flexural rigidity, polymeric textile products of a high Young's modulus in the form of monofilaments may be used, for example, aramid monofilaments of a diameter of the order of one tenth of a millimeter or several tenths of a millimeter, and these may be cabled in the manner of steel wires. By way of illustration, we shall mention Patent WO 92/12018. However, the very low intrinsic critical compression threshold of this type of product, which is defined as the maximum deformation in compression before the structure collapses, makes the assembly very fragile with respect to compressive stresses. There may result rapid, irreversible degradation in compression of the assemblies, hence the great difficulty of using anything other than steel for triangulation plies in the belt of the tires, because the drift of a tire causes bending on edge of the belt which is located beneath the tread, which stresses in compression certain parts of the reinforcement elements.

Another way of using textile fibers of high modulus and high tenacity (aramid fibers, aromatic polyester fibers—for example Vectran—, polybenzobisoxazole) consists in producing a monodirectional elongate composite used without cabling or equivalent operation. Depending on the volume content of the reinforcement element, it is possible to obtain a Young's modulus greater than that of a textile plied yarn. The bending modulus is very close to the modulus of extension and there is a real flexural rigidity, which can be modulated according to the choice of size and form of the section. However, such products have an intrinsic weakness in compression, that is to say a low breaking stress in compression linked with the use of textile fibers which themselves have a low, or even very low, critical threshold of deformation in compression. Now, it is known that use as a belt reinforcement for radial tires requires sufficient ability of the reinforcement element to resist compression.

SUMMARY OF THE INVENTION

The object of the invention is to propose a tire of lower weight, having excellent guidance and durability properties, using elongate composite elements. In particular, the invention proposes substituting elongate composite elements of monofilament appearance, that is to say, non-cabled ones, for the steel cords of the belt.

The invention therefore relates to a tire of elastomer comprising reinforcement elements, in which at least one reinforcement element is an elongate composite element of monofilament appearance, comprising substantially symmetrical technical fibers, said fibers being of great lengths, said fibers being impregnated in a thermoset resin having an initial modulus of extension of at least 2.3 GPa, in which said fibers are all parallel to each other, said elongate composite element having an elastic deformation in compression at least equal to 2%, and having in flexion a breaking stress in compression greater than the breaking stress in extension.

It turns out that glass fibers are very particularly suitable. Certain carbon fibers of low Young's modulus may also be suitable. It is also possible to use a hybrid assembly comprising glass fibers. Preferably, the thermoset resin has a glass transition temperature $T_g$ greater than 130° C. Advantageously, the initial modulus of extension of the thermoset resin is at least 3 GPa. Preferably, said elongate composite element has an elastic deformation in compression at least equal to 3%.

"Tire" designates equally well tires designed to operate under a certain rated inflation pressure and non-pneumatic tires.

The invention makes it possible, for example, to substitute in the two superposed plies commonly present in the belt, elongate composite elements for the steel cords.

DESCRIPTION OF PREFERRED EMBODIMENTS

Figure 1:
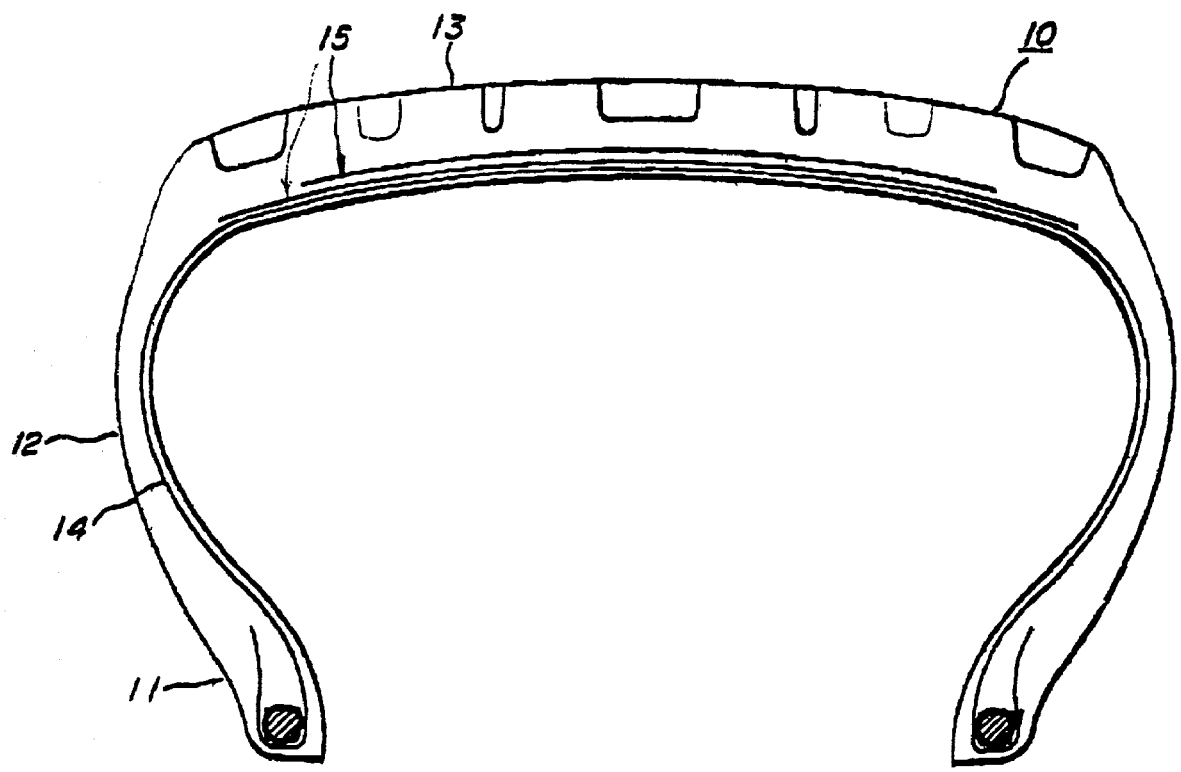
FIG. 1 shows a tire reinforced as proposed by the present invention.

In passing, we should mention that said elongate composite element, after being manufactured, for example by pultrusion, may be covered with an adhesive layer, for example a layer of resorcinol-formaldehyde latex (RFL) adhesive, in order to permit good adhesion to a sulphur-vulcanisable elastomer, as is well known per se.

The drawing shows an application which is of very particular interest, but is not limitative, to a tire 10 for a passenger vehicle, comprising a tread 13, two sidewalls 12, and a radial carcass 14 anchored on either side in a bead 11. An elongate composite element of the monofilament type, having the properties indicated, reinforces that part of the tire which is located beneath the tread 13.

In this specific application, said elongate composite element is arranged in parallel lengths 15 extending from one shoulder to the other, the lengths being arranged in at least two radially superposed plies, the lengths being arranged at angles of opposite signs from one ply to the other. In this application to plies forming a triangulation with the radial carcass, the absolute value of said angle is typically between 60° and 10°.

In order to withstand without damage small radii of curvature, which are for example characteristic of the working of the triangulation plies of the belt of a tire, it is necessary to obtain a good combination between the properties of the resin, of the reinforcement element and the size of the section of the elongate composite. A certain level of ability of the fiber to be deformed in extension is not sufficient to guarantee the composite in flexion a performance at the level of the elongation at break in extension. The best results in flexion of the composite, in terms of relative deformations, are obtained with fibers having mechanical properties which are balanced in traction and in compression. Glass fiber falls within this category.

A technical fiber referred to as "substantially symmetrical" was selected, that is to say, one which is fairly well balanced in traction and compression, which imparts thereto a fairly symmetrical behavior under stress by alternating bending, and thus good endurance. With a fiber which is poorly balanced in traction and compression, for example aramid, there is immediately found, in compression of the composite, the weakness in compression of the textile fiber.

Furthermore, the resin has to be selected so as to provide sufficient cohesion between the textile fibers in all circumstances. It is advisable for the resin at all times to ensure sufficient cohesion between the fibers to avoid rapid collapse in compression following micro-buckling of the fibers in the resin.

Preferably, the elongate composite element used is such that the initial modulus of extension is at least 30 GPa, and the breaking stress in compression is at least equal to 0.7 GPa.

Vinyl-ester or epoxy resins meet the requirements set forth above well. The elongation at break of the resin is preferably also selected according to the deformation potential of the fibers. Since the glass fiber "E" or "R" has a consequent elongation at break in extension and in compression, it is possible to use elongate composite elements of monofilament appearance of large section, of the order of a millimeter if the shape is cylindrical, while ensuring a minimum radius of curvature which is perfectly compatible with the deformations of the belt. This causes sufficient flexural rigidity to avoid destructive local buckling under stresses under high drift. The glass fiber "E" offers a good compromise between cost price and mechanical properties. This does not rule out the use of the glass fiber "R" for more demanding applications. The fiber content is advantageously between 30% and 80% of the overall weight of the elongate composite element. Preferably, the fibers are glass fibers and the fiber content is between 50% and 80% of the overall weight of the elongate composite element. The density is preferably less than 2.2, and is advantageously between 1.4 and 2.05.

Advantageously such an elongate composite element can be manufactured continuously by pultrusion. This is a known technique for making it possible to use long fibers. It consists of unwinding the fibers of unlimited length, and immersing them in a resin bath to impregnate them. Then they are drawn through a heated die, then through a heated chamber where the polymerization takes place. In this manner, it is possible to draw, in a great length and continuously, products of any section, which is dictated by the shape of the die, which are referred to as "elongate composite elements of monofilament appearance" or more simply "elongate composite elements" in the present specification. The word "monofilament" has been used in contrast to the technological concept of "cabled yarn" or "plied yarn". In fact, the elongate composite element, viewed in section, comprises numerous elementary filaments embedded in a resin which, when polymerized, imparts the appearance of a single strand to the product.

For the manufacture, the starting point is a spun yarn (or roving) generally comprising a large number (of the order of several hundreds) of elementary filaments of a diameter of several microns, these filaments all being side by side, and therefore substantially parallel to each other, except for a few overlaps. Although it is in fact impossible to guarantee that the filaments will be arranged absolutely perfectly in parallel, the expression "substantially parallel to each other" is intended to indicate that it is not a cabled yarn or a braid and that the filaments are arranged parallel, except for the geometric accuracy of the arrangement.

Another known possibility, which is suitable in particular for the discontinuous manufacture of lengths of elongate composite element, consists of arranging the fibers as desired in a mold, creating a vacuum and finally impregnating the fibers with the resin. The vacuum permits very effective impregnation of the fibers. U.S. Pat. No. 3,730,678 illustrates this impregnation technology.

Having recalled that the flexural rigidity is defined by the equation $R=E*I$, in which E is the Young's modulus and I the moment of inertia of the section, in the comparison of an elongate composite element according to the invention and a reinforcement element of the steel cord type, the solid appearance (compared with a cabled reinforcement element)

makes it possible to offer a moment of inertia of large section, which compensates for a Young's modulus for the elongate composite element based on glass fibers which is intrinsically less than for a steel cord. However, owing to the significant elastic deformations in traction and in compression of the elongate composite element, the solid appearance is not crippling for the relatively moderate radii of curvature achieved in particular in the reinforcement of tires.

An elongate composite element was compared with a steel cord in the application to the reinforcement beneath the tread of a tire. The reference for this comparison is a 6.23NF steel cord. Its rigidity "R" equals: R≅160 Newton*mm². In this example, the non-hooped steel cord is composed of 6 wire 0.230 mm in diameter. The moment of inertia of the assembly, in an approximate value, is equal to 6 times the moment of inertia of each elementary cord (see "Platt, M. M., Klein, W. G. and Hamburger, W. J., Textile Research Journal 29, 627 (1959)"). The rigidity of an elongate composite element of 0.9 mm diameter, having a mass content of fibers of 76% (or weight of filaments) and a Young's modulus of 40,000 MPa is: R≅1170 Newton*mm².

In order to confirm the good resistance to compression of the elongate composite element, in its application as a reinforcement element in the tire, an elongate composite element of circular section, forming a loop for the loop test mentioned below, was subjected to undulating flexion culminating in 1.3% deformation. After $10^7$ cycles at 1.3% imposed deformation, the tensile force of which the elongate composite element is capable lost less than 4%. Considering that a deformation of 1.3% is greater than the plastic deformation of a conventional steel cord, it will be understood that such an elongate composite element may easily be substituted for a steel cord in a belt beneath the tread of a tire, with no risk of being adversely affected by the repetitive compressive stresses to which this type of reinforcement element is subjected.

To illustrate the invention, two tires of dimension 185/65 R14 86V were produced, In the first tire (Tire A), in accordance with the invention, an elongate composite element of monofilament type is used for the lengths 15 (see FIG. 1) in the plies beneath the tread 13. In the second tire (Tire B), which is not in accordance with the invention, a steel cord is used instead of the elongate composite element of monofilament type.

Some specifics regarding the examples illustrating the invention, the properties measured and the test methods used are given below.

A—Titer of the yarn: the titer of the yarn used, expressed in tex, is that quoted by the manufacturer.

B—Mass per unit of length: the mass per unit of length of the elongate composite elements, expressed in g/m, is determined by weighing samples of 10 m in length; the result is the average of three weighings.

C—Density: the densities of the elongate composite elements and of the cross-linked resin are measured using a specialized balance from Mettler Toledo of the type PG503 DeltaRange; the samples, of several centimeters, are successively weighed in air and dipped into methanol; the software of the apparatus then determines the density; the density is the average of three measurements; the density of the glass fiber is that quoted by the manufacturer.

D—Mass content of fibers: the mass content of fibers, expressed in percent, is calculated by dividing the weight of 1 m of fibers, obtained from the linear density, by the mass per unit of length of the elongate composite element.

E—Glass transition temperature ($T_g$): the glass transition temperature is measured by the method of differential thermal analysis; the value desired is selected by definition in the middle of the transition; the apparatus used is a calorimeter manufactured by Mettler.

F—Diameter: the diameter of the elongate composite element is determined by calculation from its mass per unit of length and its volume mass, in accordance with the formula:

$$D = 2(M_l/\pi\rho)^{0.5}$$

D representing the diameter of the elongate composite element in mm, $M_l$ the mass per unit of length in g/m and ρ the volume mass in g/cm³.

The shape of the section of the elongate composite element is confirmed using a Leica stereoscopic microscope of type M420.

G—Mechanical properties: the mechanical properties of the elongate composite elements are measured using an Instron traction machine of type 4466; the elements measured are subjected to traction over an initial length of 400 mm; all the results are obtained with an average of 10 measurements.

The initial modulus of extension is determined in accordance with the calculation code 19.3 of the software SERIE IX supplied with the traction machine. This calculation is effected in accordance with the principle of ASTM Standard D 638.

The qualitative comparison of the properties in compression are measured on the elongate composite element by what is called the loop test method (D. Sinclair, J. App. Phys. 21, 380 (1950)). In the present use of this test, a loop is produced which is gradually brought to the breaking point. The nature of the break, which can easily be observed owing to the large size of the section, makes it possible immediately to realize that the elongate composite element of the invention, when subjected to bending stress until it breaks, breaks on the side where the material is in extension, which can be identified by simple observation. Given that in this case the dimensions of the loop are large, it is possible to read the radius of the circle inscribed in the loop at any time. The radius of the circle inscribed just before the breaking point corresponds to the critical radius of curvature. It is designated by $R_m$. The following formula then makes it possible to determine the critical elastic deformation by calculation:

$$e_{cr} = r/(R_m + r)$$

in which r corresponds to the radius of the elongate composite element.

The breaking stress in compression is obtained by calculation by the following formula:

$$\sigma_c = e_{cr} M_i$$

in which $M_i$ is the initial modulus in extension.

Since, in the case of the elongate composite element according to the invention, the breaking of the loop appears in the part in extension, it is concluded that, in flexion, the breaking stress in compression is greater than the breaking stress in extension.

The breaking under flexion of a rectangular beam in accordance with what is called the three-point method was also effected. This method corresponds to ASTM Standard D 790. This method also makes it possible to confirm, visually, that the nature of the break is in fact in extension.

H—Measurement of the cornering force The measurement of the cornering force is effected directly on the vehicle using a dynamometric core from IGEL (Ingenieurgesellschaft für Leichtbau mbH) of the Federal Republic of Germany. This apparatus, which is provided with sensors which make it possible to measure the forces in the directions of the three axes.

The reinforcement element plies of the tires tested are formed as follows:

| tire A | |
|---|---|
| Composite element: | circular section of 0.88 mm |
| laying pitch: | 1.8 mm |
| angle between the plies: | 23° |
| strength of ply: | 444 daN/cm |
| tire B | |
| steel cord: | 6 cabled cords of 0.230 mm |
| laying pitch: | 1.4 mm |
| angle between the plies: | 25° |
| strength of ply: | 444 daN/cm |
| The weights of the tires are as follows: | |
| tire A, in accordance with the invention: | 7.65 kg |
| tire B, control with steel wires: | 8.16 kg |

After running on a vehicle, all other conditions otherwise being equal, each tire develops the same cornering force of 119 daN at a drift angle of 1°, illustrating that the elongate composite element of monofilament type of the invention is suitable for the application illustrated.

The invention extends to an elongate composite element, of a length which is very great relative to the section, comprising substantially symmetrical technical fibers, said fibers being of great lengths, said glass fibers being impregnated in a thermoset resin having an initial modulus of extension of at least 2.3 GPa, in which said fibers are all substantially parallel to each other, the fiber content being between 30% and 80% of the overall weight of the elongate composite element, the density of the elongate composite element being less than 2.2, said elongate composite element having in flexion a breaking stress in compression greater than the breaking stress in extension, said elongate composite element having an elastic deformation in compression at least equal to 2%.

As has already been stated in connection with the description of the tire according to the invention, it turns out that glass fibers are very particularly well suited. Preferably, the thermoset resin has a glass transition temperature $T_g$ greater than 130° C. Advantageously, the initial modulus of extension of the thermoset resin is at least 3 GPa. Preferably, the substantially symmetrical technical fibers are glass fibers and the fiber content is between 50% and 80% of the overall weight of the elongate composite element.

A reference beam, which is not in accordance with the invention, was produced, having a mass content of glass fiber of 60% with a low-modulus resin having the following characteristics:

| Components | Parts by weight | Initial modulus (GPa) | Glass transition temperature ($T_g$) (° C.) |
|---|---|---|---|
| Epoxy DER 331 | 100 | 1.5 | 114 |
| HY 917 | 80 | | |
| Benzyldimethylamine | 1 | | |
| Hycar 1300x8 | 50 | | |

In flexion, the reference beam has a break on the side which is stressed in compression.

A beam in accordance with the invention, having a mass content of glass fiber of 70%, was produced with a resin having the following characteristics:

| Components | Parts by weight | Initial modulus (GPa) | Glass transition temperature ($T_g$) (° C.) |
|---|---|---|---|
| Epoxy DER 331 | 100 | 3.39 | <124 |
| HY 917 | 80 | | |
| Benzyldimethylamine | 1 | | |
| DY 040 | 30 | | |

This beam according to the invention has in flexion a break on the side which is stressed in extension.

Advantageously, the density, the minimum value of the breaking stress in compression and the minimum value of the initial modulus of extension are those already indicated. The section of said elongate composite element is for example circular, a typical diameter of an application to the reinforcement of tires being greater than 0.4 mm, or is for example oblong. One particular aspect of the elongate composite element relates to the elastic deformation in extension thereof, which is substantially equal to its elastic deformation in compression.

I claim:

1. A tire of elastomer including a tread, plies located beneath the tread, and comprising reinforcement elements, in which at least one reinforcement element is an elongate composite element of monofilament appearance, comprising substantially symmetrical technical fibers, each of said substantially symmetrical technical fibers having an elastic deformation in extension which is substantially equal to the elastic deformation in compression, said fibers being of great lengths, said fibers being impregnated in a thermoset resin having an initial modulus of extension of at least 2.3 GPa, in which said fibers are all parallel to each other, said elongate composite element having an elastic deformation in compression at least equal to 2%, and having in flexion a breaking stress in compression greater than the breaking stress in extension, wherein said elongate composite element reinforces the plies which are located beneath the tread.

2. A tire according to claim 1, in which said substantially symmetrical technical fibers are glass fibers.

3. A tire according to claim 2, in which the fiber content is between 30% and 80% of the overall weight of the elongate composite element, the density of the elongate composite element being less than 2.2.

4. A tire according to claim 3, in which the fibers are glass fibers and the fiber content is between 50% and 80% of the overall weight of the elongate composite element.

5. A tire according to claim 1, in which the thermoset resin has a glass transition temperature Tg greater than 130° C.

6. A tire according to claim 1, in which the initial modulus of extension of the thermoset resin is at least 3 GPa.

7. A tire according to claim 1, in which said elongate composite element is covered with a layer of resorcinol-formaldehyde latex (REL) adhesive.

8. A tire according to claim 1, in which said elongate composite element is arranged in parallel lengths extending from one shoulder to the other, the lengths being arranged in at least two plies which are superposed radially, the lengths being arranged at angles of contrary signs from one ply to the other.

9. A tire according to claim 8, in which the absolute value of said angle is between 60° and 10°.

10. A tire according to claim 1, in which the initial modulus of extension is at least 30 GPa.

11. A tire according to claim 1, in which the elongate composite element has a breaking stress in compression at least equal to 0.7 GPa.

12. A tire according to claim 1, in which the elongate composite element has a circular section.

13. A tire according to claim 12, in which the diameter of said circular section is greater than 0.4 mm.

14. A tire according to claim 1, in which said elongate composite element has an elastic deformation in compression at least equal to 3%.

15. A tire of elastomer including a tread, plies located beneath the tread, and comprising reinforcement elements, in which at least one reinforcement element is an elongate composite element of monofilament appearance, comprising long glass fibers, said fibers being impregnated in a thermoset resin having an initial modulus of extension of at least 3 GPa, in which said fibers are all parallel to each other, said elongate composite element having an elastic deformation in compression at least equal to 2%, and having in flexion a breaking stress in compression greater than the breaking stress in extension, wherein said elongate composite element reinforces the plies which are located beneath the tread.

16. A tire according to claim 15, in which said fibers of said elongate composite element have an elastic deformation in extension which is substantially equal to the elastic deformation in compression.

17. A tire according to claim 15, in which said elongate composite element is covered with a layer of resorcinol-forinaldehyde latex (REL) adhesive.

18. A tire according to claim 15, in which said elongate composite element is arranged in parallel lengths extending from one shoulder to the other, the lengths being arranged in at least two plies which are superposed radially, the lengths being arranged at angles of contrary signs from one ply to the other.

19. A tire according to claim 18, in which the absolute value of said angle is between 60° and 10°.

20. A tire according to claim 15, in which the fiber content is between 50% and 80% of the overall weight of the elongate composite element, the density of the elongate composite element being less than 2.2.

21. A tire according to claim 15, in which the initial modulus of extension is at least 30 GPa.

22. A tire according to claim 15, in which the elongate composite element has a breaking stress in compression at least equal to 0.7 GPa.

23. A tire according to claim 15, in which the elongate composite element has a circular section.

24. A tire according to claim 15, in which the diameter of said circular section is greater than 0.4 mm.

* * * * *